US006921239B2

(12) United States Patent
Arrez et al.

(10) Patent No.: US 6,921,239 B2
(45) Date of Patent: Jul. 26, 2005

(54) DAMAGE-RESISTANT REFUSE RECEPTACLE LIFTER

(75) Inventors: Ramiro Arrez, Chicago, IL (US); Carols Arrez, Berwyn, IL (US)

(73) Assignee: Perkins Manufacturing Company, LaGrange, IL (US)

( * ) Notice: Subject to any disclaimer, the term of this patent is extended or adjusted under 35 U.S.C. 154(b) by 233 days.

(21) Appl. No.: 10/102,060

(22) Filed: Mar. 20, 2002

(65) Prior Publication Data

US 2002/0141854 A1 Oct. 3, 2002

Related U.S. Application Data

(60) Provisional application No. 60/280,091, filed on Mar. 30, 2001.

(51) Int. Cl.$^7$ .................................................. B65F 3/00
(52) U.S. Cl. ........................................ 414/408; 414/421
(58) Field of Search ................................ 414/408, 421, 414/406

(56) References Cited

U.S. PATENT DOCUMENTS

| | | |
|---|---|---|
| 1,475,483 A | 11/1923 | Galuska |
| 1,763,499 A | 6/1930 | Bolger |
| 2,480,959 A | 9/1949 | Presnell |
| 2,824,658 A | 2/1958 | Beasley |
| 3,032,216 A | 5/1962 | McCarthy |
| 3,040,919 A | 6/1962 | Nolan |
| 3,136,436 A | 6/1964 | Erlinder et al. |
| 3,147,870 A | 9/1964 | Urban et al. |
| 3,170,580 A | 2/1965 | Soyko |
| 3,211,312 A | 10/1965 | Miller |
| 3,270,902 A | 9/1966 | Breault |
| 3,279,633 A | 10/1966 | Evers |
| 3,327,876 A | 6/1967 | Kolling |
| 3,415,169 A | 12/1968 | Naddell |

(Continued)

FOREIGN PATENT DOCUMENTS

| | | |
|---|---|---|
| AT | 243183 | 2/1965 |
| BE | 510235 | 4/1952 |
| CA | 622499 | 6/1961 |

(Continued)

OTHER PUBLICATIONS

Lifting Mechanism for a Sanitation Vehicle, U.S. Appl. No. 378,823, filed May 12, 1982, now abandoned (bearing production Nos. B984–1005), with photographs (dated Dec., 1981) (bearing production Nos. B1082–1097), photographs of a present version of the above cited reference (bearing production Nos. B1098–1110A), and other related documents (bearing production Nos. 935–937, 939, 948–977, 981, 983, 1006–1025, and 1111–1125).

Refuse Removal Systems, Inc., "Waste Wheeler," Waste Age, 1982 (with photographs of the device bearing production Nos. B913–922).

(Continued)

*Primary Examiner*—Douglas Hess
(74) *Attorney, Agent, or Firm*—Cook,Alex,McFarron, Manzo,Cummings & Mehler, Ltd.

(57) ABSTRACT

A lifting device for lifting and tilting a refuse container includes a base, a drive unit mounted to the base and having a rotatable output shaft, a carriage for engaging and lifting the refuse container, at least one lift arm having a first end carried by the output shaft and a second end associated with the carriage, and at least one actuator arm having a first end pivotably carried by the base and a second end pivotably associated with the carriage. One of the lift arm or the actuator arm is pivotable at a location along the length thereof to allow movement of the carriage relative to the base and independent of rotation of the output shaft allowing movement of the carriage in response to obstacles or road debris so as to prevent damage to the lifter. In another embodiment, the carriage may include an upper portion carrying an upper hook and a lower portion carrying a lower hook where the lower portion is pivotable relative to said upper portion to allow movement of said lower hook relative to said upper hook independent of rotation of said output shaft.

46 Claims, 5 Drawing Sheets

U.S. PATENT DOCUMENTS

| | | |
|---|---|---|
| 3,516,562 A | 6/1970 | Knight |
| 3,576,215 A | 4/1971 | Cline |
| 3,576,265 A | 4/1971 | de Cordova et al. |
| 3,662,910 A | 5/1972 | Herpich et al. |
| 3,730,365 A | 5/1973 | Herpich et al. |
| 3,732,997 A | 5/1973 | Reavis et al. |
| 3,738,516 A | 6/1973 | Wells |
| 3,747,785 A | 7/1973 | Dahlin |
| 3,762,586 A | 10/1973 | Updike, Jr. |
| 3,773,197 A | 11/1973 | Blakeley et al. |
| 3,804,277 A | 4/1974 | Brown et al. |
| 3,822,802 A | 7/1974 | Evans, Jr. |
| 3,823,973 A | 7/1974 | Ramer |
| 3,837,512 A | 9/1974 | Brown |
| 3,841,508 A | 10/1974 | Ebeling et al. |
| 3,844,434 A | 10/1974 | Blakeley et al. |
| 3,861,547 A | 1/1975 | Sink, Sr. |
| 3,884,376 A | 5/1975 | Rivers |
| 3,894,642 A | 7/1975 | Shive |
| 3,901,255 A | 8/1975 | Pettit |
| 3,931,901 A | 1/1976 | Jones |
| 3,944,092 A | 3/1976 | Ebeling et al. |
| 3,954,194 A | 5/1976 | Stedman |
| 3,964,624 A | 6/1976 | Werder |
| 3,987,999 A | 10/1976 | Savage |
| 4,042,137 A | 8/1977 | Hughes et al. |
| 4,057,156 A | 11/1977 | Thompson et al. |
| 4,090,626 A | 5/1978 | Ebeling et al. |
| 4,091,944 A | 5/1978 | Gollnick |
| 4,096,959 A | 6/1978 | Schaffer |
| 4,113,125 A | 9/1978 | Schiller |
| 4,175,903 A | 11/1979 | Carson |
| 4,219,298 A | 8/1980 | Stragier et al. |
| 4,227,849 A | 10/1980 | Worthington |
| 4,230,359 A | 10/1980 | Smith |
| 4,237,857 A | 12/1980 | Sharp, Sr. |
| 4,295,776 A | 10/1981 | Payne et al. |
| 4,313,707 A | 2/1982 | Bingman et al. |
| 4,345,868 A | 8/1982 | Rizzo et al. |
| 4,348,147 A | 9/1982 | Helm |
| 4,363,588 A | 12/1982 | Stickney |
| 4,365,922 A | 12/1982 | Borders |
| 4,372,726 A | 2/1983 | Lutz |
| 4,401,407 A | 8/1983 | Breckenridge |
| 4,422,814 A | 12/1983 | Borders |
| 4,427,333 A | 1/1984 | Ebeling |
| 4,435,117 A | 3/1984 | House |
| 4,450,828 A | 5/1984 | Oaken et al. |
| 4,461,607 A | 7/1984 | Smith |
| 4,461,608 A | 7/1984 | Boda |
| 4,479,751 A | 10/1984 | Wyman et al. |
| 4,527,939 A | 7/1985 | Suarez |
| 4,538,951 A | 9/1985 | Yeazel et al. |
| 4,543,028 A | 9/1985 | Bell et al. |
| 4,548,542 A | 10/1985 | Reese |
| 4,557,658 A | 12/1985 | Lutz |
| 4,566,840 A | 1/1986 | Smith |
| 4,575,300 A | 3/1986 | George |
| 4,597,710 A | 7/1986 | Kovats |
| 4,597,712 A | 7/1986 | Smith |
| 4,613,271 A | 9/1986 | Naab |
| 4,669,940 A | 6/1987 | Englehardt et al. |
| 4,673,327 A | 6/1987 | Knapp |
| 4,687,405 A | 8/1987 | Olney |
| 4,699,557 A | 10/1987 | Barnes |
| 4,708,570 A | 11/1987 | Smith et al. |
| 4,715,767 A | 12/1987 | Edelhoff et al. |
| 4,722,658 A | 2/1988 | Wurtz et al. |
| 4,726,726 A | 2/1988 | Dossena et al. |
| 4,741,658 A | 5/1988 | Zelinka et al. |
| 4,773,812 A | 9/1988 | Bayne et al. |
| 4,844,682 A | 7/1989 | Edelhoff |
| 4,872,801 A | 10/1989 | Yeazel et al. |
| 4,909,564 A | 3/1990 | Pfeifer et al. |
| 4,911,600 A | 3/1990 | Zelinka et al. |
| 4,936,732 A | 6/1990 | Naab et al. |
| 4,966,514 A | 10/1990 | Knapp |
| 4,983,092 A | 1/1991 | Richards |
| 4,992,018 A | 2/1991 | Prout et al. |
| 5,002,450 A | 3/1991 | Naab |
| 5,007,786 A | 4/1991 | Bingman |
| 5,015,142 A | 5/1991 | Carson |
| 5,015,143 A | 5/1991 | Carson |
| 5,018,929 A | 5/1991 | Carson |
| 5,024,573 A | 6/1991 | Redding et al. |
| 5,026,104 A | 6/1991 | Pickrell |
| 5,026,241 A | 6/1991 | Wyman |
| 5,028,196 A | 7/1991 | Richards |
| 5,035,563 A | 7/1991 | Mezey |
| 5,049,026 A | 9/1991 | Bingman et al. |
| 5,056,979 A | 10/1991 | Niederer |
| 5,069,593 A | 12/1991 | Zelinka et al. |
| 5,071,303 A | 12/1991 | Carson |
| 5,071,307 A | 12/1991 | Carson |
| 5,092,731 A | 3/1992 | Jones et al. |
| 5,098,250 A | 3/1992 | Carson |
| 5,114,304 A | 5/1992 | Edelhoff et al. |
| 5,163,805 A | 11/1992 | Mezey |
| 5,205,698 A | 4/1993 | Mezey |
| 5,209,537 A | 5/1993 | Smith |
| 5,230,393 A | 7/1993 | Mezey |
| 5,257,877 A | 11/1993 | Zelinka et al. |
| 5,266,000 A | 11/1993 | LeBlanc |
| 5,303,841 A | 4/1994 | Mezey |
| 5,308,211 A | 5/1994 | Bayne |
| 5,333,984 A | 8/1994 | Bayne et al. |
| 5,344,272 A | 9/1994 | Nuyts |
| 5,360,310 A | 11/1994 | Jones et al. |
| 5,391,039 A | 2/1995 | Holtom |
| 5,466,110 A | 11/1995 | Redding |
| 5,470,187 A | 11/1995 | Smith et al. |
| 5,482,180 A | 1/1996 | Smith et al. |
| 5,484,245 A | 1/1996 | Zopf |
| 5,505,576 A | 4/1996 | Sizemore et al. |
| 5,513,942 A | 5/1996 | Pickrell |
| 5,551,824 A | 9/1996 | Zanzig et al. |
| 5,562,386 A | 10/1996 | Browning |
| 5,601,392 A | 2/1997 | Smith et al. |
| 5,607,277 A | 3/1997 | Zopf |
| 5,639,201 A | 6/1997 | Curotto |
| 5,720,588 A | 2/1998 | Graves |
| 5,720,589 A | 2/1998 | Christenson et al. |
| 5,755,547 A | 5/1998 | Flerchinger et al. |
| 5,769,592 A | 6/1998 | Christenson |
| 5,775,867 A | 7/1998 | Christenson |
| 5,791,861 A | 8/1998 | Seelig |
| 5,797,715 A | 8/1998 | Christenson |
| 5,807,056 A * | 9/1998 | Osborn et al. .............. 414/406 |
| 5,813,824 A | 9/1998 | Zanzig et al. |
| 5,829,944 A | 11/1998 | Szinte |
| 5,833,428 A | 11/1998 | Szinte |
| 5,853,277 A | 12/1998 | Everhart |
| 5,890,865 A | 4/1999 | Smith et al. |
| 6,059,511 A | 5/2000 | Anderson et al. |
| 6,095,744 A | 8/2000 | Harrison |
| 6,139,244 A | 10/2000 | VanRaden |
| 6,158,945 A | 12/2000 | Anderson |
| 6,167,795 B1 | 1/2001 | Bayne et al. |
| 6,183,185 B1 | 2/2001 | Zanzig et al. |
| 6,293,863 B1 | 9/2001 | Carr et al. |
| 6,325,587 B1 | 12/2001 | Wysocki et al. |

| | | | |
|---|---|---|---|
| 6,357,988 B1 | 3/2002 | Bayne | |
| 6,413,031 B1 * | 7/2002 | Yakley et al. | 414/406 |
| 6,439,667 B1 * | 8/2002 | Weets et al. | 298/11 |
| 6,503,045 B2 * | 1/2003 | Arrez et al. | 414/408 |
| 6,551,046 B1 * | 4/2003 | Dorrington | 414/408 |
| 2001/0046430 A1 | 11/2001 | Bayne | |
| 2002/0119034 A1 | 8/2002 | Arrez | |
| 2002/0141854 A1 | 10/2002 | Arrez | |
| 2002/0141855 A1 | 10/2002 | Arrez | |
| 2003/0099529 A1 | 5/2003 | Arrez | |

FOREIGN PATENT DOCUMENTS

| | | |
|---|---|---|
| CH | 358747 | 1/1962 |
| CH | 453203 | 6/1968 |
| DE | 811 456 | 8/1951 |
| DE | 844 262 | 3/1952 |
| DE | 1 226 035 | 9/1966 |
| DE | 1 236 403 | 3/1967 |
| DE | 2 146 653 | 3/1967 |
| DE | 1 531 763 | 1/1970 |
| DE | 2 051 270 | 10/1970 |
| DE | 30 24 081 | 1/1981 |
| EP | 0 078 011 | 4/1983 |
| EP | 0 312 900 | 4/1989 |
| EP | 0 405 428 | 1/1991 |
| EP | 575 867 | 12/1993 |
| FR | DN 82300 | 6/1954 |
| FR | 2 272 002 | 12/1975 |
| FR | 2 459 779 | 1/1981 |
| FR | 2 479 783 | 10/1981 |
| FR | 2 500 425 | 8/1982 |
| GB | 291709 | 6/1928 |
| GB | 2 078 196 | 1/1982 |
| GB | 2 080 757 A | 2/1982 |
| GB | 2 188 302 | 9/1987 |
| SU | 751794 | 7/1980 |
| SU | 1 253 892 | 8/1986 |
| WO | WO 83/03242 | 9/1983 |
| WO | WO 91/00231 | 1/1991 |
| WO | WO91/05721 | 5/1991 |
| WO | WO92/01612 | 2/1992 |
| WO | WO93/25457 | 12/1993 |
| WO | WO94/21540 | 9/1994 |

OTHER PUBLICATIONS

Rubbermaid "Mobile Toter.".

McKagen, World Wastes, "Supercan! Can . . . And Does,"Jun. 1983, pp. 24–26.

Waste Age, Mar. 1982, pp. 31–33.

U.S. Appl. No. 10/081,654 (pending) to Arrez et al. including PTO filing receipt, specification, claims, abstract, and drawings.

U.S. Appl. No. 10/108,825 (pending) to Arrez et al. including PTO filing receipt, specification, claims, abstract, and drawings.

Zarn Model "D" sales brochure, printed prior to Mar. 20, 2002.

Taskmaster Lifter features/specifications from: http://www.baynethinline.com/products_taskmaster.htm.

U.S. Appl. No. 10/718,336, filed Nov. 20, 2003, entitled "Front Mounted Lifter For Front Load Vehicle.".

Arrez et al., U.S. Appl. No. 10/767,041, filed Jan. 29, 2004, entitled "Heavy Duty Cart Lifter.".

Arrez et al., U.S. Appl. No. 10/691,989, filed Oct. 23, 2003, entitled "Receptacle Lifter With Retractable Gripper Arms.".

Bayne Brochure Thinline Grabber Lifter, Model GTLS 1110, undated (2 pages).

Perkins Mfg. Brochure: "The Original Rotary Tuckaway," Model D6080–20K, (2 pages).

Bayne Brochure Thinline® Grabber Lifter, Model GTLS 1110, undated, (2 pages).

* cited by examiner

DAMAGE-RESISTANT REFUSE RECEPTACLE LIFTER

This application claims the benefit of Provisional Application Ser. No. 60/280,091 filed Mar. 30, 2001.

BACKGROUND OF THE INVENTION

The present invention relates generally to lifters for mounting on refuse collection vehicles and, more specifically, to such lifters that can non-destructively accommodate collisions or impacts with road surfaces or other obstacles.

Refuse container lifters are typically, although not exclusively, mounted on mobile refuse collectors such as trucks. In the case of truck-mounted refuse container lifters, they are usually attached to the rear end, adjacent to the refuse hopper. One example of a truck-mountable refuse container lifter is shown in co-pending U.S. patent application Ser. No. 09/731,946 by the inventors Ramiro Arrez and Carlos Arrez, incorporated herein by reference. Another example is shown in a provisional application by the same inventors which was filed on Feb. 27, 2001, entitled "Retractable Lifter for Refuse Container," and which is also incorporated herein by reference.

When not being used, such refuse container lifters mounted on the back of collections trucks are often retracted to a position where they will not substantially interfere with dumping larger commercial containers into the refuse hopper or backing the truck against a loading dock. This usually involves moving the lifter to a lowered position, and for some lifters, to a position fully or partially beneath the refuse hopper of the truck. In their retracted position, current refuse container lifters may be susceptible to collision, impact or other destructive contact with the road surface or with obstacles or other road debris or obstructions within the path of the truck that may strike the lifter. Most such lifters are hydraulically controlled by a hydraulic drive unit, such as a hydraulic cylinder or hydraulic motor. When the lifter is retracted, the hydraulic drive unit holds the lifter firmly in the retracted position when the lifter collides with the road surface or obstacles. The hydraulic drive unit does not move significantly, and as a result, the collision results in the bending or breaking of part of the lifter. Although lifters have been designed to prevent such damage, they typically rely on complicated linkage arrangements that do not, in any event, accommodate severe impact or allow significant movement of the lifter to prevent damage.

Accordingly, it is an object of the present invention to provide a lifter for lifting, tilting and dumping residential-style refuse containers that has improved reliability and resistance to damage or destruction from obstacles within the path of the truck.

It is a more specific object of the present invention to provide a refuse container lifter having a structure that is adapted to give way to or to accommodate obstacles, road debris and the like in a non-destructive manner.

It is a still further object of the present invention to provide such a refuse container lifter that also is simple in design so that it may be efficiently and economically manufactured.

SUMMARY OF THE INVENTION

The present invention is generally embodied, in one aspect, in a lifting device for lifting and tilting a refuse container, which device includes a base and a drive unit with a rotatable output shaft. The lifter includes at least one lift arm, which has a first end carried by the drive unit output shaft and a second end which is associated with a container-engaging and lifting carriage. To accommodate collisions or impacts non-destructively in accordance with the present invention, the lift arm is pivotable at a location along its length to allow movement of the carriage (or a part thereof), relative to the base, independent of rotation of the drive unit output shaft.

In accordance with another aspect of the present invention, the lifter may include at least one actuator arm having one end pivotably carried (either directly or indirectly) by the base and a second end pivotably associated with the carriage. This arrangement is particularly, but not exclusively, applicable to a lifter that also includes a reciprocally movable or telescoping member, allowing one portion of the carriage to move relative to another portion as the carriage is raised and lowered during dumping of the refuse container. To accommodate collisions or impacts non-destructively, one of the lift arm or the actuator arm (or both) is pivotable at a location along the length thereof to allow movement of the carriage (or part of the carriage) relative to the base (for example, upon contact with the road surface) independent of rotation of the drive unit output shaft.

In another aspect of the invention, the lifting device may have a multi-portion carriage which includes an upper portion and a lower portion, and wherein the lower portion is capable of pivotable movement relative to the upper portion, which movement is independent of rotation of the drive unit output shaft. In such an embodiment, each of the upper and lower portions typically have a hook associated therewith so that the lower hook moves relative to the upper hook during non-destructive movement of the carriage lower portion.

This application incorporates by reference the provisional application entitled, Damage-Resistant Refuse Receptacle Lifter with Face Plate, by the inventors Ramiro Arrez and Carlos Arrez, filed on the same date as this application.

DETAILED DESCRIPTION OF THE PREFERRED EMBODIMENT

Figure 1:
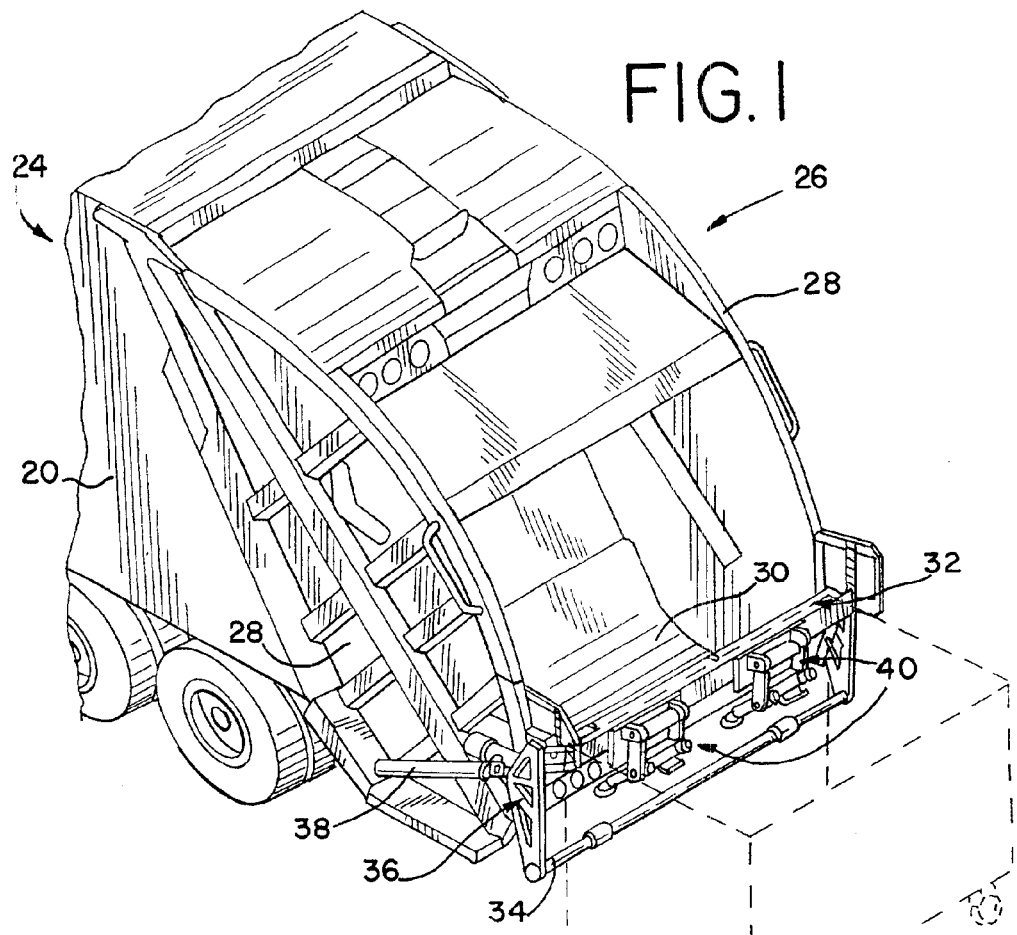
FIG. 1 is a perspective view, partially removed, of a rear-loading refuse collection truck including two lifters in accordance with the present invention.

FIG. 1 illustrates a typical rear loading refuse collection truck of the type having a pair of sidewalls 20, a top wall 22, and bottom wall (not shown) forming a refuse collection body, generally at 24. A rear load hopper assembly, generally at 26, is mounted at the back of the collection body and includes sidewalls 28 and a curved bottom hopper wall 30. The bottom hopper wall slopes upwardly toward a rearward sill or sill edge 32, over which refuse is dumped into the collection hopper. For convenience, the directions corresponding to the front and rear of the truck will be the same as those used for the present invention.

Figure 2:
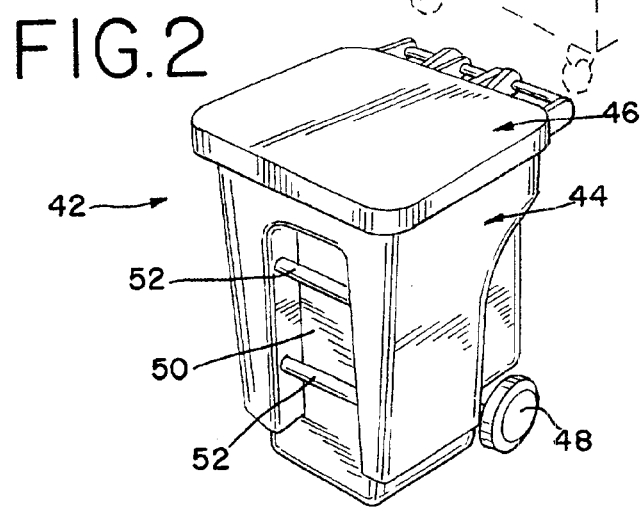
FIG. 2 is an enlarged perspective view of a typical residential refuse container used with the lifter of the present invention. Although shown using a larger scale than FIG. 1, the refuse container actually is suitable for loading on either one of the lifters shown in FIG. 1.

The collection truck illustrated in FIG. 1 is adapted for dumping very large, multi-cubic yard containers, commonly referred to as dumpsters, one of which is shown in dashed lines in FIG. 1, as well as much smaller residential style containers (as shown for example in FIG. 2). For dumping the large containers a tipper or kick bar 34 is pivotably attached to the back of the truck by a bracket 36 that is rotated by a hydraulic cylinder 38. When a large container is to be dumped, the container is rolled into position adjacent the sill area of the collection truck. A trunnion bar, which extends along one edge of the container, is captured by a latching mechanism, such as is shown in U.S. Pat. No. 5,720,588, or in a slot that extends along the sill of the truck. The container is lifted and tilted by rotating it about the trunnion bar. In the illustrated truck, the container is lifter by the tipper bar 34, which is rotated from under the truck and pushed against the front side of the container, lifting and tilting it. Other trucks have other mechanisms for lifting and tilting containers, such as a cable and winch.

For dumping smaller, residential style containers, the refuse collection truck in FIG. 1 includes two lifters 40, embodying the present invention, mounted at the rear, although only one could also be used. The lifters 40 of the present invention are shown on the particular truck illustrated in FIG. 1 solely for purposes of illustration. The lifters of the present invention may also be used on trucks that use the cable and winch system for dumping large multi-yard containers or on trucks devoted solely to residential pick-up. In addition, lifters 40 may be used on side load trucks, (in which refuse is added through a side opening), may be mounted on the larger multi-yard containers (with suitable hydraulic attachments to a source of hydraulic fluid power), or may be mounted on stationary refuse dumping stations. As will be described in more detail later, the lifter 40 illustrated in FIG. 1 may be advantageously used with tipper bar-equipped trucks because the lifter retracts to a size and position clear of the path of travel of the tipper bar, so as not to interfere with tipper operation when large multi-yard containers are being dumped. However, the present invention is not limited to lifters suitable for trucks equipped with tipper bars, but may be used with other types or styles of lifters, as shown for example in FIG. 8, which will be discussed in more detail later.

Before turning to a more detailed description of the lifter 40 of FIG. 1, reference is made to FIG. 2, which shows a typical residential roll out container 42 for which the present lifter is intended. The typical container 42 is made of rigid plastic construction, with a body 44 and a hinged lid 46. A pair of wheels 48 allow the container to be conveniently moved curbside or to another pickup location. The front side of the container includes a generally recessed area 50 to accommodate lifter units on the refuse collection vehicle. For cooperation with such lifters, a pair of parallel, spaced-apart lift bars 52 are firmly secured in the container body in the recessed area 50. Some residential containers do not have bars but have comparable functional structures molded into or otherwise attached to the container. Lid 46 is hingedly connected to the body, so that the lid is naturally opened by gravity when the container is inverted for dumping. It should be understood that refuse collection containers of the type shown, are available in a variety of styles and designs, and the present invention is not limited to any particular type style or design of refuse collection container.

Figure 3:
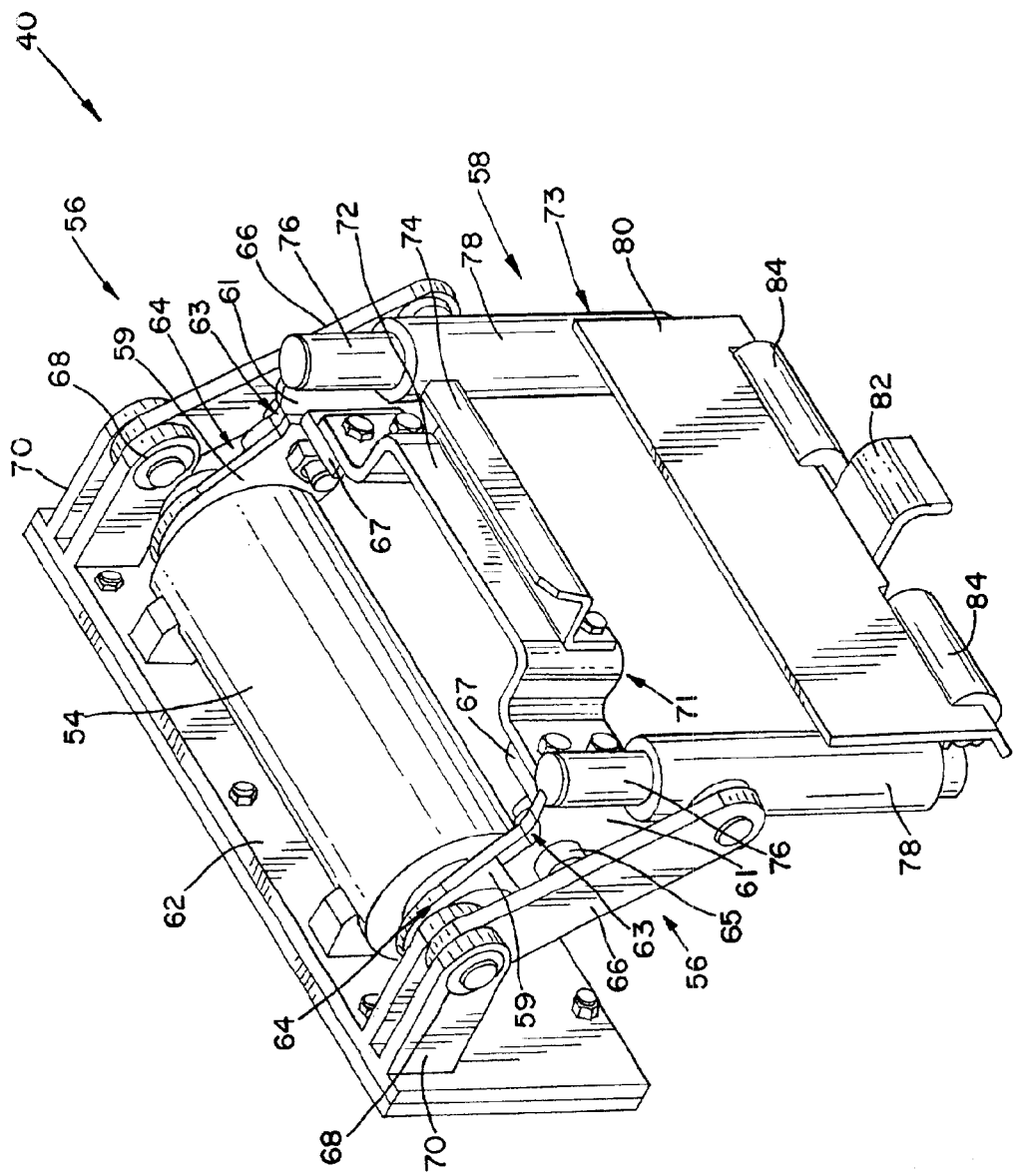
FIG. 3 is a perspective view of the lifter of the present invention.
Figure 4:
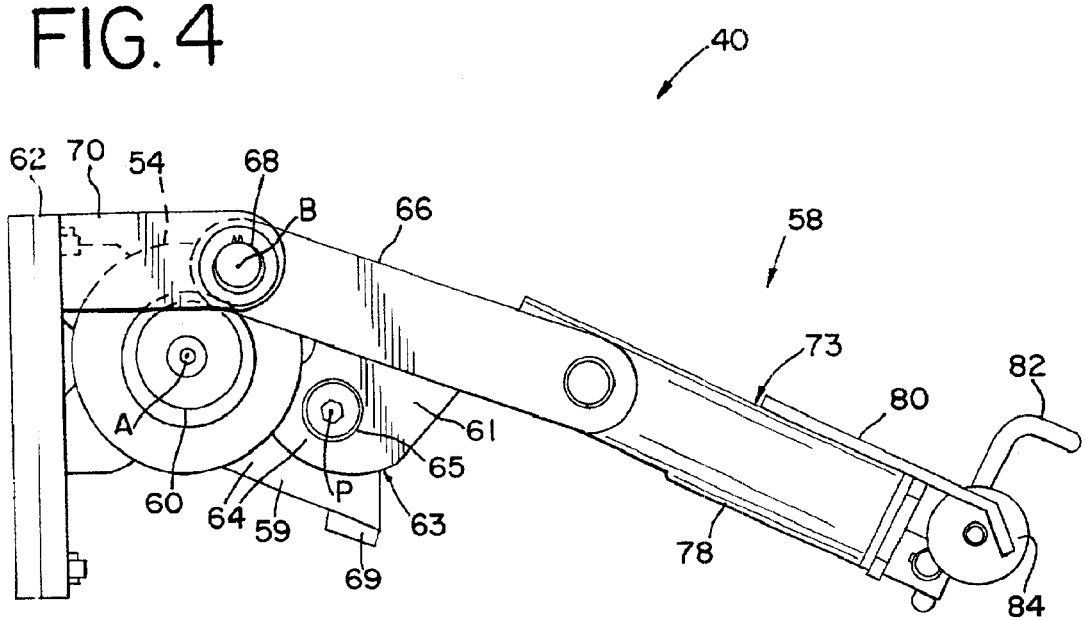
FIG. 4 is a side view of the lifter of FIG. 3 shown in a partially raised position.

The lifter 40 embodying the present invention is perhaps best seen in FIG. 3, a perspective view of the lifter in an intermediate position between the retracted position (as in FIG. 1) and the fully raised position (a partially raised position is shown in FIG. 4). The lifter 40 of the present invention, in its illustrated embodiment, includes a drive unit or actuator 54, at least one lift arm and actuator arm pair generally at 56, and a container carriage, generally at 58. The drive unit 54 has a generally horizontal rotatable output shaft 60 (see FIG. 7) that extends through at least one end of the drive unit, and preferably through each end of the drive unit. The drive unit 54 may be of any suitable design and may be, for example, a rotary hydraulic motor. Most preferably, the drive unit is an HS series helical hydraulic shaft rotary drive unit, as supplied by Helac Corporation of Enumclaw, Wash. These drive units are available in a variety of torque capabilities, and Model HS-15K is believed to be suitable for the present application. The drive unit 54 is attached, as by welding or bolting, either directly or indirectly, to a mounting or base plate 62. It is also possible for the drive unit to be attached to another structure, instead of directly to the base itself, which is either directly mounted to the base or indirectly mounted to the base through one or more intermediate structures. Accordingly, when it is stated that a particular component is "mounted to" or "carried by" the base plate, it is intended that such phrase be broadly construed to mean both direct mounting and indirect mounting, where intermediate structures may be located between the particular component and the base plate.

Figure 6:
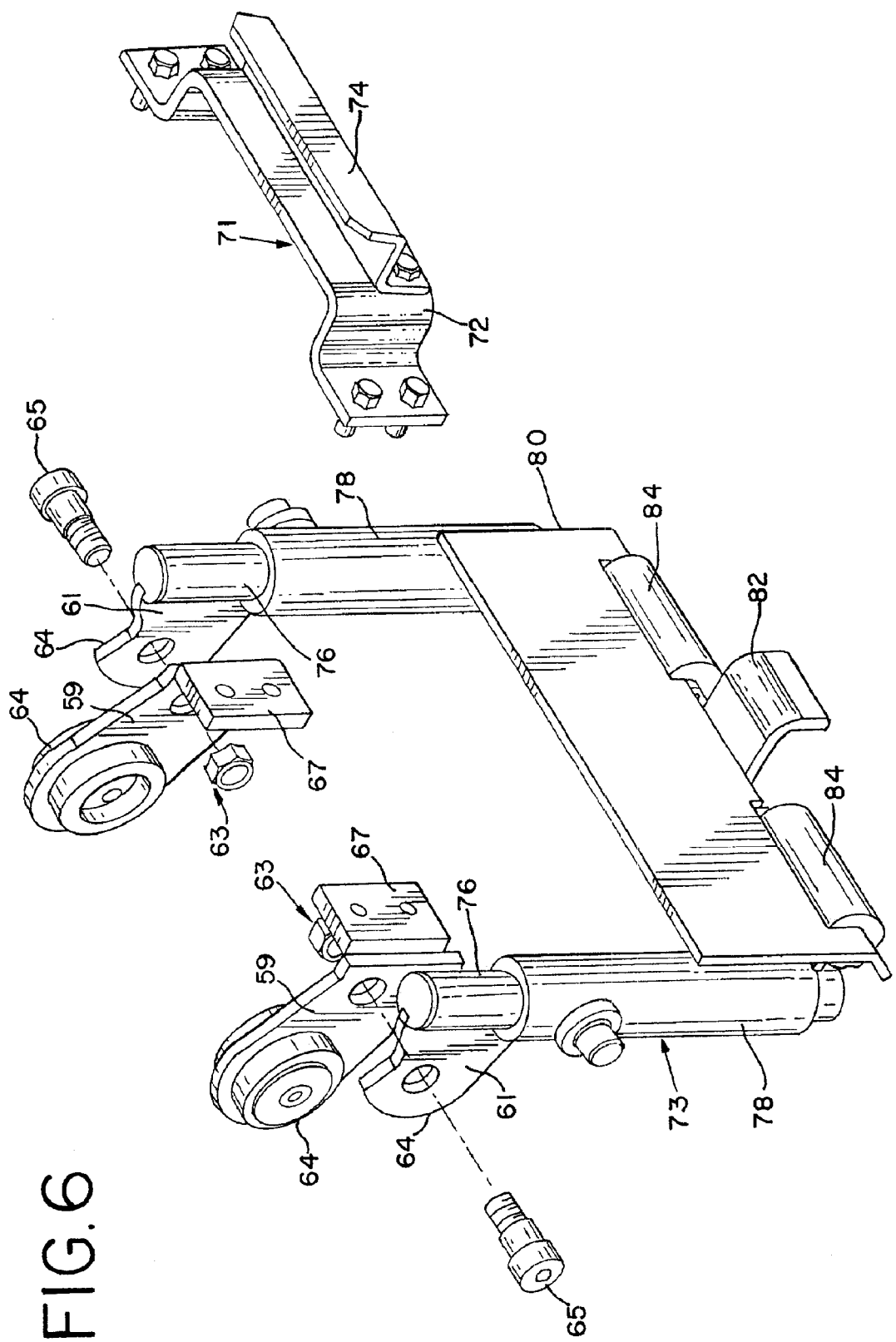
FIG. 6 is an exploded perspective view of the lifter of FIG. 3.
Figure 7:
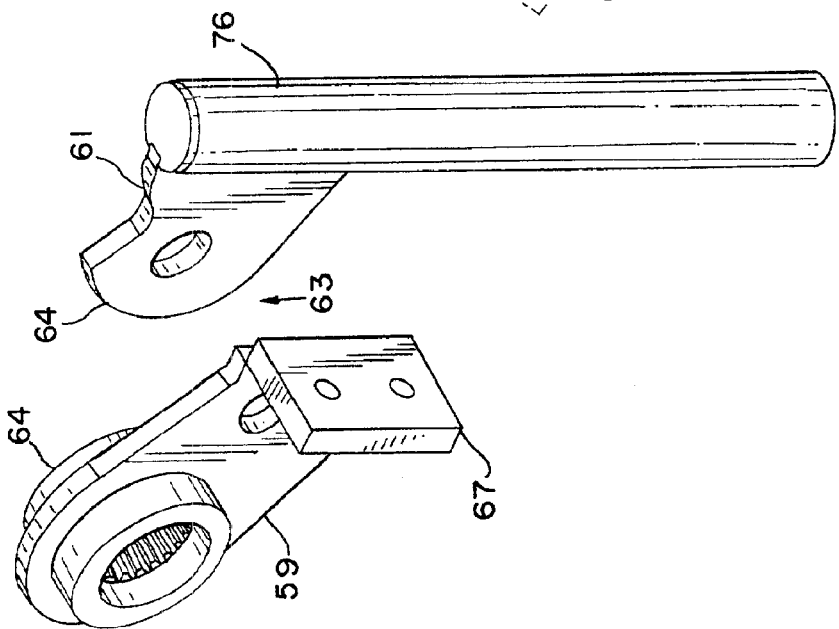
FIG. 7 is an exploded perspective view of a lift arm of the present invention shown using an enlarged scale.

For lifting the container carriage, a lift arm 64 is attached to the output shaft 60 of the drive unit 54, and preferably a lift arm is fixed to each opposed end of the output shaft. Rotation of the output shaft 60 occurs along a first axis of rotation A. The other end of the lift arm is attached, as by welding, bolting or other attachment, either directly or indirectly, to the carriage, as will be described in more detail later. As best seen in FIGS. 3, 6 and 7, each lift arm 64 is divided into first and second arm portions 59 and 61 which are pivotably joined together defining a hinge, generally indicated at 63. The portions may be pivotably attached in a variety of ways using any type of fastener. In the illustrated embodiment in FIG. 6, the first and second arm portions 59 and 61 are pivotably attached with a shoulder bolt 65, which includes a bolt head, an intermediate unthreaded shank and a terminal threaded portion for threadably receiving a nut. It is preferred that the length of the intermediate unthreaded shank is approximately equal to or slightly less than the combined thickness of the first and second arm portions 59 and 61 so that the portions may be compressively held together between the bolt head and the nut.

The hinge 63 defined at the shoulder bolt is generally positioned at an intermediate location on the lift arm 64 between the respective ends thereof, and the particular position may be varied, depending on the lifter structure, according to any location along the length of the lift arm. As indicated in FIG. 3, the hinge has an axis of rotation P along which the second arm portion 61 of the lift arm 64 is pivotable in relation to the first arm portion 59. When the lifter is retracted, the axis of rotation P is axially displaced from the axis of rotation A of the output shaft 60 and it is located rearwardly and below the axis A. Adjacent the hinge 63, there is a flange 67 carried by the first arm portion 59.

The second arm portion 61 is allowed to rotate counterclockwise about the axis P, when viewed as seen in FIG. 3. To prevent clockwise rotation beyond the relative position seen in FIG. 3, the first arm portion 59 of the lift arm 64 includes a stopping member 69. The stopping member 69 is positioned so as to limit the pivotable movement of the second arm portion 61 relative to the first arm portion 59. Pivoting of the lift arm 64 will be described in further detail later.

For inverting the carriage as it rotates from the retracted position, the actuator arm 66 is pivotably mounted at 68 to the base plate 62 at a location beyond the end of the output shaft 60. Each actuator arm 66 is pivotably mounted to a bracket 70 that is welded or otherwise attached to the base plate. Of course, it is also possible that the actuator arm 66 is attached to an additional intermediate structure which is either directly or indirectly attached to the base plate 62. When the lifter is retracted, the axis of rotation B at the pivot 68 is displaced from and preferably located above both the axis of rotation A of the output shaft 60 and the axis of rotation P of the hinge 63. In particular, the retracted position shows that the axis of rotation B of the actuator arm 66 is located slightly rearward of axis of rotation A of the output shaft 60 and forward of axis of rotation P of the hinge 63. During lifting, tilting and dumping activities, the lift arm will pivot along the axis of rotation A resulting in corresponding movement of the axis of rotation P relative to both axes A and B. The other end of each actuator arm 66 is pivotably attached to the carriage, as discussed in more detail below.

The container carriage 58 of the present invention may be of various constructions, such as an open frame, a solid face plate or other variations common in the lifter art. In the illustrated embodiment of the present invention, the carriage generally includes an upper portion 71 and a lower portion 73. The upper portion 71 includes an upper cross member 72 that carries a hook or saddle 74 that serves to hook under the uppermost lift bar 52 on the refuse container 42 as the lifter is moved from the retracted position to the extended position. Each end of the upper cross member 72 is welded, bolted or otherwise attached, directly or indirectly, to the first arm portion 59 of the lift arm 64 at the flange 67. In this way the upper portion 71 moves corresponding to movement of the lift arm 64 so that as the lift arm is rotated by the output shaft 60 the upper portion 71 is also raised or lowered.

The carriage lower portion 73 includes a lower cross member 80 which is carried either directly or indirectly, by the second arm portion 61 and which has a downwardly facing hook or saddle 82 for engaging over the lowermost lift bar 52 of a refuse collection container 42. In the illustrated embodiment, the lower portion 73 of the carriage further includes a reciprocally movable member on each side thereof having inner and outer telescoping members 76 and 78. These members could be provided separately from the carriage, but making them part of the carriage reduces the number of parts and thus the material and labor costs. The inner telescoping member 76, as illustrated, is a solid cylindrical steel rod, and is attached directly or indirectly to the second arm portion 61 of the lift arm 64 as, for example, by welding. The outer telescoping member 78, as illustrated, is a steel sleeve or tube. The inner telescoping member 76 slides substantially into the outer telescoping member 78 when the lifter is in the retracted position thereby reducing the distance between the upper hook or saddle 74 and the lower hook or saddle 82. As discussed in more detail later, this has particular application on trucks employing tipper bars because it results in the lower part of the lifter rising as it retracts for clearance over the tipper bar.

Other arrangements or configurations for members 76 and 78 may be used which allow for the relative motion without departing from the present invention. For example, the members 76 and 78 could be of any other shape, such as C-shaped or U-shaped or simply flat shape, provided that relative movement may be achieved between the two members to cause, directly or indirectly, relative movement between the upper and lower hooks or saddles 74 and 82. The outer telescoping member 78 is pivotably attached to the end of the actuator arm 66. The lower cross member 80 of the carriage extends substantially between and is attached to each of the outer telescoping members 78. In addition to the hook 82, the lower cross member 80 also may mount a pair of rollers 84 to protect the wall of the container as it is lifted, tilted and dumped. The rollers serve to support the container wall to prevent gouging by the lower hook or damage to the container as the lower hook moves downwardly during rotation of the carriage. In addition, the lower hooks 82 may be spring loaded to permit a degree of flexing in the event that the hook should engage against the wall of the container. Other cushioning members, bumpers or the like may also be carried by the lower cross member 80.

Due to the pivotable arrangement between the first and second arm portions 59 and 61, the lower hook 82 is pivotable relative to the upper hook 74 in the event the carriage collides with obstacles or road surfaces. As with the case with most lifters, they are hydraulically controlled to move between a retracted position and a fully raised position by the hydraulic drive unit or actuator. When the lifter is retracted, it is held in a fixed position by the hydraulic drive unit, and a portion of the lifter, such as the carriage or a portion thereof, is positioned substantially underneath of the refuse hopper. Ordinarily in the retracted position, the carriage, particularly the lower portion thereof, is exposed to the risk of damage or otherwise destruction contact with the obstacles or road surfaces. Because the hydraulic drive unit holds the lifter in a fixed position, the lifter is not capable of moving significantly in response to such impacts, and instead, the force from the collision must be absorbed by the lifter, which may result in either the bending or breaking of part of the lifter or other destructive contact thereto. The present invention however is capable of accommodating such impacts non-destructively without harm to the lifter. Thus, when an obstacle comes into contact with the carriage lower portion or lower hook, the lower portion or lower hook will move away from the obstacle to avoid damage to the lifter.

Pivotable movement of the lifter in response to road surfaces, obstacles or the like occurs as follows. First, the road surface, obstacle or the like will typically impact or collide with the lowermost portion of the lifter. In particular, the impact force will be directed towards the lower portion of the carriage. As a result of such impact, the shoulder bolt connection allows the first and second arm portions 59 and 61 (which are held in their normal position by friction and by the stopping member 69) of the lift arm 64 to rotate relative to one another, and the lower portion 73 of the carriage will move or pivot counterclockwise, in relation to the view of the lifter shown in FIG. 5. Pivotable movement of the lower portion is generally proportional to the amount of force resulting from the impact. If the force of impact is small then the lower portion will pivot by a small amount so as provide sufficient clearance over the obstacle. If the force of impact is large then the lower portion will pivot appreciably. In either case, the force of impact is largely or totally translated into pivotable movement of the lifter rather than damage or destruction to the lifter. After impact, the lower portion of the carriage may be returned to its retracted position, by loosening the shoulder bolts slightly, so long as the road surface or obstacles is no longer present. Return of the lifter to its retracted position occurs upon clockwise rotation of the lower portion of the carriage, in the view shown in FIG. 5, until halted by the stopping member 69 when the first and second arm portions of the lift arm are in their normal position.

In the preferred illustration, the upper portion 71 and the upper hook 74 is carried by the first arm portion 59 of the lift arm 64 and the lower portion 73 and the lower hook 82 is carried by the second arm portion 61 of the lift arm. Since each arm portion carries a different hook, pivoting of the second arm portion 61 in relation to the first arm portion 59 allows the lower hook 82 to be pivotable in relation to the upper hook 74. Pivotable movement of the second arm portion 61 and the carriage lower hook 82 occurs along the axis of rotation P and is independent of the rotation of the output shaft 60.

Figure 5:
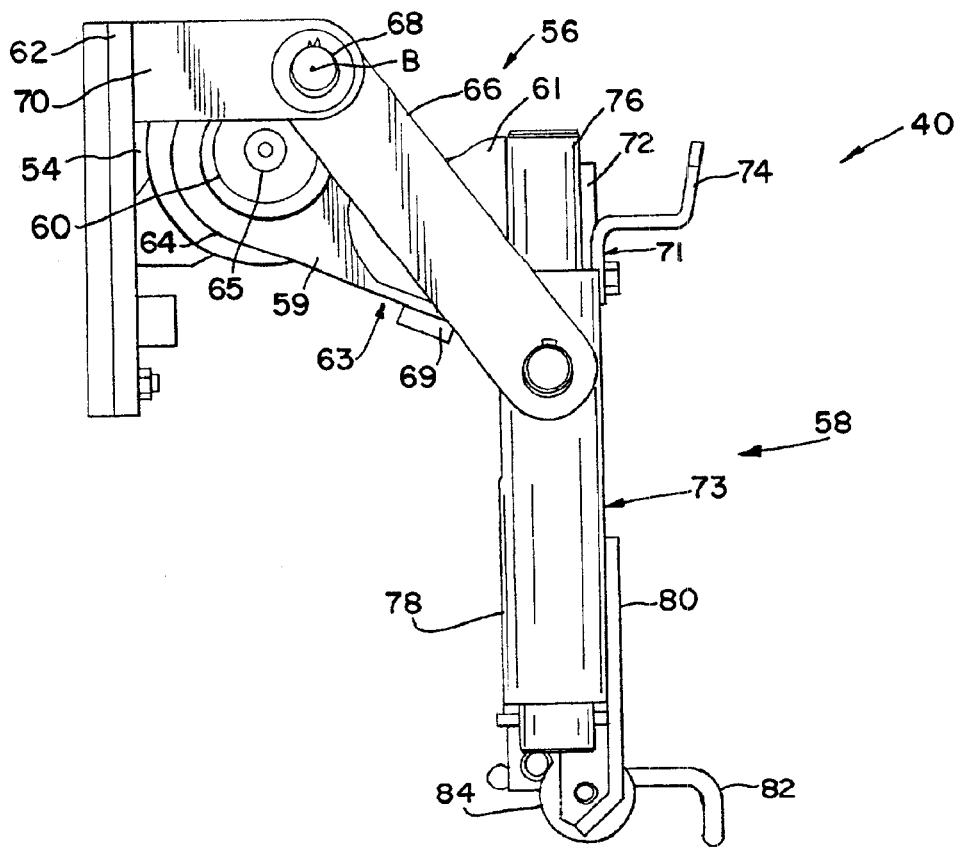
FIG. 5 is a side view of the lifter of FIG. 3 shown in an intermediate position which is capable of receiving a refuse container thereon.

Normal operation of the refuse container lifter occurs as follows. As the output shaft 60 rotates counterclockwise, the carriage moves from the fully retracted position to the intermediate position shown in FIG. 5. Rotation of the output shaft 60 translates into movement by the lift arm 64 causing the lift arm to raise the carriage. The hinge does not interfere with the normal role of the lift arm in lifting, tilting and dumping the refuse container. As illustrated in FIGS. 4–5, the placement of the stopping member 69 on the first arm portion 59 prevents downward (clockwise) pivotable movement by the second arm portion 61 past the stopping member. During rotational movement of the output shaft, the first and second arm portions will not move relative to each other due to the weight of the refuse container on the hooks causing the second arm portion 61 to engage the stopping member 69. Upon upward movement of the lift arm 64, the displaced axes of the pivot 68 and output shaft 60 cause the actuator arm 66 to push against the outer member 78, causing it to slide downwardly relative to the inner member 76, and increasing the spacing X between the upper saddle or hook 74 and the lower saddle or hook 82. Upward movement of the lift arm 64 also causes the axis of rotation P of the hinge 63 to move relative to the axis of rotation A of the output shaft 60 and relative to the axis of rotation B of the actuator arm 66. The upper and lower hooks 74 and 82 extend into the recessed area 50 of the refuse collection container and locate between the lift bars 52, with the upper hook 74 engaging under and beginning to lift the upper lift bar 52 of the refuse collection container 42, and the lower hook 82 being located above the lower lift bar of the refuse collection container.

As the lifter continues to rotate upwardly in FIG. 4, the upper hook 74 lifts the refuse container, and continued upward rotation of the lifter also results in the actuator arm 66 continuing to push the lower hook away from the upper hook (due to displaced axes of the pivot and the output shaft). Upon further upwards rotation of the lifter, the lower hook 82 engages over the lower lift bar of the collection container and at this position the weight of the container shifts so that the lower bar of the collection container rests against the lower hook 82 of the lifter. In the fully extended position, the distance between the upper and lower hooks are such as to effectively capture the refuse collection container on the lifter so that the refuse container cannot fall from the lifter. More specifically, the upper and lower hook are spaced apart nearly the same distance that the upper and lower lift bars of the refuse container are spaced apart, so that the container cannot shift enough that either lift bar can be remove from its respective hook. Since the upper and lower hooks are juxtaposed against the corresponding upper and lower bar of the refuse collection container, pivotable movement of the lower hook relative to the upper hook is substantially restrained. The relative motion of the hooks is reversed as the lifter rotates back toward the retracted position, with the inner and outer members 76 and 78 sliding or telescoping together, drawing the cross members 72 and 80, and their respective hooks 74 and 82, closer together for release of the container.

Because the height or length of the carriage actually shortens as it moves from the extended position to the retracted position, it is particularly useful on refuse collection trucks of the type using a tipper or kick bar 34 as illustrated in FIG. 1. In other words, the length of the lifter is sufficiently reduced as it moves to the retracted position so that it can pass over the tipper bar and not interfere with the use of the tipper bar for dumping substantially larger multi-yard containers or dumpsters. In this retracted position, the lift arms 64 and actuator arms 66 extend generally vertically. Moreover, when the lifter is in the retracted position, the entire carriage 58 is located below and almost parallel to the refuse hopper wall and is positioned generally forward of the rearward-most edge of the lifter. This aids in providing a thin profile when the lifter is to be mounted to the rear of refuse collection trucks that are also used in handling commercial collection chores.

As noted earlier, the container carriage, with relatively movable hooks, could be a separate assembly operatively attached to the relatively movable members 76 and 78 for moving the hooks. In the illustrated embodiment the relatively movable members 76 and 78 are directly attached, respectively, to the cross members 72 and 80, which tends to reduce cost and simplify construction. The upper and lower hooks may be directly attached, respectively, to the first and second arm portions 59 and 61 or may be indirectly attached through other supporting structures. Alternatively, the second arm portion 61 may be pivotably associated either directly or indirectly with one portion of the carriage to allow pivotable movement of one portion of the carriage in relation to the other portion, irrespective of which portion or portions on which the upper and lower hooks are positioned.

There are variety of techniques used for mounting lifters on refuse collection trucks, some of which provide more protection to the lifter than others. For example, refuse collection trucks as delivered from a manufacturer, typically have a rearward-most reinforcing member along the hopper lip, which is commonly referred to as the sill or sill beam. Although not usually recommended by the manufacturer, lifters such as the present invention may be mounted in recesses cut into the sill to recess the drive unit or actuator and other parts of the lifter and better protect them from damage during dumping of much larger collection containers. Alternatively, a so-called sill extender may be mounted to the original sill, and the dump or lifter mounted within recesses in the sill extender. Alternatively, the lifter may be mounted directly on the original sill, and small bumpers placed on either side to help protect the lifter. The effect is similar, the lifter drive unit and other parts are better protected from damaging contact with the large multi-yard containers when they are dumped. The lifter of the present invention may be mounted to the rear of trucks without using any of the above techniques.

Figure 8:
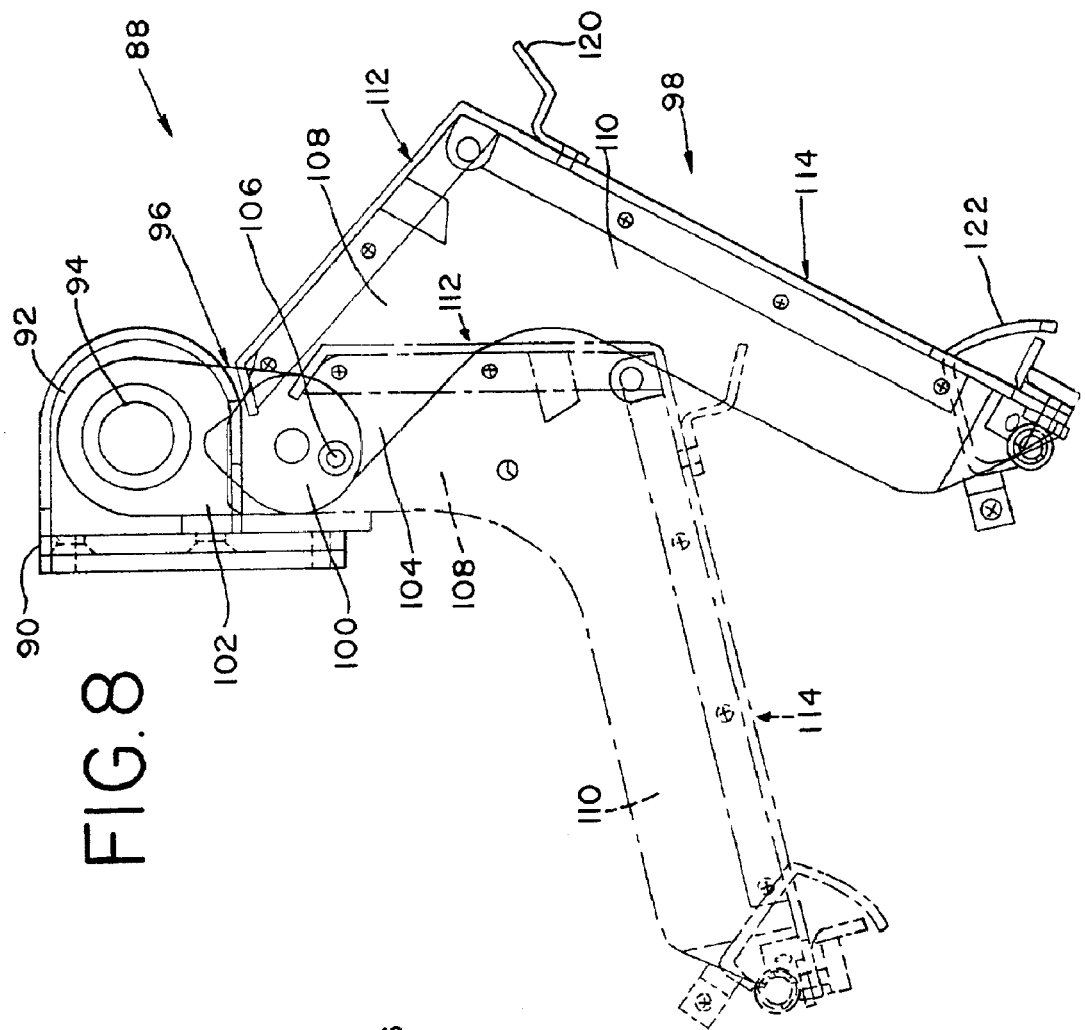
FIG. 8 is a side view of another embodiment of the present invention.

As illustrated in FIG. 8, an alternate lifter 88 without an actuator arm is shown in both intermediate and retracted positions. The lifter 88 includes a base 90, a drive unit 92, a rotatable output shaft 94, at least one lift arm, generally indicated at 96, and a carriage, generally indicated at 98. As illustrated in FIG. 8, the lifter 88 includes two lift arms, one being located on each side of the drive unit output shaft 94. The lift arm 96 has one end which is carried either directly or indirectly by the drive unit output shaft 94 and the other end is associated either directly or indirectly with the carriage 98. The lift arm 96 is pivotable at a location along the length thereof defining a hinge 100 to allow movement of the carriage 98 relative to the base 90 and independent of rotation of said output shaft 94. The hinge 100 is preferably located at an intermediate location between the two ends of the lift arm 96 and divides the lift arm into a first and second arm portions 102 and 104 which are pivotably associated either directly or indirectly with each other.

Relative movement of the second arm portion 104 in relation to the first arm portion 102 is normally restrained by a ball plunger 106. The ball plunger 106 is defined by concave and convex facing portions, one of which is disposed on the first arm portion 102 and the other of which is disposed on the second arm portion 104. When the concave and convex portions matingly engage each other, the lift arm 96 may be raised and lowered so as to perform normal lifting, tilting and dumping operations. To restrain the lift arm from downward clockwise rotation during lifting, tilting and dumping operations, a stopping member or interfering tab 69 is positioned on one of the first and second arm portions which prevents the second arm portion from rotating past a certain position. Preferably the interfering tab 69 is located on the first arm portion and prevents the second arm portion from rotating past the position where the first and second arm portions are coaxial when viewed from the side of the lifter as illustrated in FIG. 8, which shows both a retracted position and a position in which the second arm portion 104 is pivoting relative to the first arm portion 102.

The second arm portion 104 can be divided further into an upper arm piece 108 which is adjacent the hinge 100 and a lower arm piece 110 which is remote from the hinge and is located substantially at a right angle to the upper arm piece. When the lifter is in the retracted position, the lower arm piece 110 is positioned substantially parallel to the refuse hopper wall whereas the upper arm piece 108 is positioned substantially perpendicular to the refuse hopper wall.

The carriage 98 is carried by the lift arm 96 and includes an upper portion, generally indicated at 112, and a lower portion, generally indicated at 114. The upper portion 112 is attached to the lower portion 114 either directly or indirectly by welding or other like attachment. Each of the carriage upper and lower portions 112 and 114 may include a cross piece which is welded or otherwise connected either directly or indirectly between the corresponding upper and lower arm pieces of the second arm portion 108 and 110. The carriage lower portion 114 further includes two hooks, an upper hook 120 adjacent the carriage upper portion 112 and a lower hook 122 which is positioned on a bottom edge of the carriage lower portion 114. A linkage mechanism (not shown) may be associated with the lower hook 122 in order to move the lower hook to engage the lower bar 52 of the refuse container 42 during lifting, tilting and dumping of the container.

In the event that the lifter 88 collides with obstacles, road debris or other potentially destructive objects, the lifter is capable of pivotable movement at the hinge to non-destructively accommodate such collisions. Pivotable movement of the lifter 88 differs appreciably, at least in one respect, from the lifter 40 in that the lifter 88 allows substantially the entire carriage 98 to be pivotable relative to the base 90 and independent of rotation of the output shaft 94. So, both the carriage upper and lower portions, and consequently the upper and lower hooks, move simultaneously during pivotable movement of the carriage. Thus, any obstacle striking any portion of the carriage can result in pivotable movement of the carriage or a portion thereof in order to prevent harm to the lifter.

Whereas the preferred form of the invention has been shown and described herein, it should be realized that there may be many modifications, substitutions and alterations thereto without departing from the scope of the claims. For instance, the lift arm may be pivotable at any location along its length, including the ends, in order to allow movement of the carriage relative to the base and independent of rotation of the output shaft. Instead of the lift arm, the actuator arm may pivotably associated, either directly or indirectly, with the carriage or a portion thereof at any point along the length of the actuator arm. Where either the lift arm or the actuator arm is indirectly pivotably associated with the carriage, any number of intermediate structures are possible. Both the lift arm and the actuator arm may be pivotable at any location along their length to allow movement of the carriage relative to the base and independent of rotation of the output shaft.

Alternatively, the carriage may be pivotable at a location anywhere along its own length regardless of where the lift arm and actuator arm are attached. For example, the hinge may be positioned on the carriage dividing the carriage into two portions to allow one portion, preferably the lower portion, to pivot or move in response to contact with obstructions or the like. In this modification, it is possible for the carriage to respond to obstructions regardless of how the lift arm and actuator arm are attached. This alternative also may be employed without an actuator arm. In another variation, instead of each upper and lower hook being carried by a different portion of the lifter arm, it is possible that the hooks could be carried by the same portion of the lift arm where the upper hook or upper portion is carried or attached to the lift arm and the lower hook or lower portion is pivotably associated with or pivotably attached to one of the lift arm and upper portion.

What is claimed is:

1. A lifting device for lifting and tilting a refuse container, said lifting device comprising:
   (a) a base;
   (b) a drive unit mounted to said base and having a rotatable output shaft;
   (c) a carriage for engaging and lifting the refuse container;
   (d) at least one lift arm having a first end carried by said output shaft and a second end associated with said carriage; and
   (e) at least one actuator arm having a first end pivotably carried by said base and a second end pivotably associated with said carriage,
   selected one of said lift arm and said actuator arm being pivotable at a location along the length thereof to allow movement of said carriage relative to said base independent of rotation of said output shaft.

2. The lifting device of claim 1 wherein said output shaft has two opposed ends defining a first axis about which said output shaft is rotatable.

3. The lifting device of claim 2 wherein said first end of said lift arm is carried by one end of said output shaft and rotates about said first axis in response to rotation of said output shaft.

4. The lifting device of claim 2 wherein at least two lift arms are secured to said output shaft, one lift arm being secured to each end of said output shaft.

5. The lifting device of claim 2 wherein said first end of said actuator arm is pivotably associated with said base for rotation about a second axis displaced from said first axis.

6. The lifting device of claim 2 wherein selected one of said lift arm and said actuator arm includes at least one hinge interposed between the respective ends thereof, said pivotal movement of selected one of said lift arm and said actuator arm occurring along a pivoting axis.

7. The lifting device of claim 6 wherein said pivoting axis is axially offset from said first axis.

8. The lifting device of claim 1 wherein at least two actuator arms are pivotably mounted to said base for rotation about a second axis displaced from said first axis.

9. The lifting device of claim 1 wherein said carriage includes an upper hook and a lower hook.

10. The lifting device of claim 9 wherein said upper hook is carried by said lift arm and said lower hook is movable by said actuator arm when said carriage is raised so that said first hook and said second hook selectively engage the refuse container.

11. The lifting device of claim 9 wherein said carriage includes a telescoping member extending between said first and said second hooks to move said hooks relative to one another as said carriage is raised and lowered.

12. The lifting device of claim 11 wherein said telescoping member comprises an inner member and an outer member, said inner member of said telescoping member being carried by said second end of said lift arm and said outer member of said telescoping member being pivotably associated with said actuator arm.

13. The lifting device of claim 11 wherein said first end of said telescoping member is carried by said second end of said lift arm.

14. The lifting device of claim 1 wherein selected one of said lift arm and said actuator arm defines a hinge at said location between the respective ends thereof to allow said movement of said carriage.

15. The lifting device of claim 14 wherein said selected one of said lift arm and said actuator arm comprises two arm portions pivotably joined at said location to define said hinge.

16. The lifting device of claim 1 wherein selected one of said lift arm and said actuator arm includes a stopping element to limit the range of pivotable movement.

17. A lifting device for lifting and tilting a refuse container, said lifting device comprising:
(a) a base;
(b) a drive unit mounted to said base and having a rotatable output shaft;
(c) a carriage for engaging and lifting the refuse container; and
(d) at least one lift arm having a first end carried by said output shaft and a second end associated with said carriage, said lift arm being pivotable at a location along the length thereof to allow movement of said carriage relative to said base independent of rotation of said output shaft.

18. The lifting device of claim 17 wherein said output shaft has two opposed ends defining a first axis about which said output shaft is rotatable.

19. The lifting device of claim 18 wherein said first end of said lift arm is secured to one end of said output shaft and rotates about said first axis in response to rotation of said output shaft.

20. The lifting device of claim 18 wherein at least two lift arms are secured to said output shaft, one lift arm being secured to each end of said output shaft.

21. The lifting device of claim 18 further comprising wherein at least one actuator arm pivotably associated with said base for rotation about a second axis displaced from said first axis.

22. The lifting device of claim 17 wherein said carriage includes an upper hook and a lower hook for selectively engaging the refuse container.

23. The lifting device of claim 22 wherein said carriage includes a telescoping member extending between said first and second hooks to move said hooks relative to one another as said carriage is raised and lowered.

24. The lifting device of claim 17 wherein said lift arm includes a hinge along the length thereof to allow movement of said carriage relative to said base independent of rotation of said output shaft.

25. The lifting device of claim 24 wherein said hinge defines a pivoting axis which is axially offset from said first axis.

26. The lifting device of claim 17 wherein said lift arm includes a stopping member to limit the range of pivotable movement of said lift arm.

27. The lifting device of claim 17 wherein said carriage includes an upper portion and a lower portion, said upper portion carrying an upper hook and said lower portion carrying a lower hook.

28. The lifting device of claim 27 wherein said lower portion is pivotably movable in relation to said upper portion.

29. A lifting device for lifting and tilting a refuse container, said lifting device comprising:
(a) a base;
(b) a drive unit mounted to said base and having a rotatable output shaft;
(c) a carriage for engaging and lifting the refuse container, said carriage including an upper portion carrying an upper hook and a lower portion carrying a lower hook;
(d) at least one lift arm having a first end carried by said output shaft and a second end associated with said carriage;
said lower portion being pivotable relative to said upper portion to allow movement of said lower hook relative to said upper hook independent of rotation of said output shaft.

30. The lifting device of claim 29 wherein said upper portion is carried by said second end of said lift arm and said lower portion is pivotably associated with said lift arm.

31. The lifting device of claim 29 wherein said lower portion and said upper portion are connected by a telescoping connection.

32. The lifting device of claim 31 wherein said upper portion includes an inner member of a telescoping member and said lower portion includes an outer member of said telescoping member.

33. The lifting device of claim 29 wherein said lower portion is pivotably carried by selected one of said upper portion and said lift arm.

34. The lifting device of claim 29 wherein selected one of said lift arm and said lower portion defines a hinge.

35. The lifting device of claim 34 wherein said lift arm comprises two arm portions pivotably joined to define said hinge.

36. The lifting device of claim 34 wherein said hinge pivots to allow upward movement of said lower hook.

37. The lifting device of claim 29 further comprising a stopping element to limit pivotable movement of said lower hook relative to said upper hook.

38. The lifting device of claim 29 wherein said pivotable movement of said lower hook occurs along a pivoting axis.

39. A lifting device for lifting and tilting a refuse container, said lifting device comprising:
   (a) a base;
   (b) a drive unit mounted to said base and having a rotatable output shaft;
   (c) a carriage for engaging and lifting the refuse container, said carriage including an upper portion carrying an upper hook and a lower portion carrying a lower hook;
   (d) at least one lift arm having a first end carried by said output shaft and a second end associated with said carriage; and
   (e) at least one actuator arm having a first end pivotably carried by said base and a second end pivotably associated with said carriage,
   said lower portion being pivotable relative to said upper portion to allow movement of said lower hook relative to said upper hook independent of rotation of said output shaft.

40. The lifting device of claim 39 wherein said upper portion is carried by selected one of said lift arm and said actuator arm.

41. The lifting device of claim 39 wherein said lower portion is pivotably carried by selected one of said lift arm and said actuator arm.

42. The lifting device of claim 39 wherein said upper portion is carried by selected one of said lift arm and said actuator arm and said lower portion is carried by selected other of said lift arm and said actuator arm.

43. The lifting device of claim 39 wherein said lower portion is pivotably carried by selected one of said lift arm and said upper portion.

44. The lifting device of claim 39 wherein said actuator arm is pivotably associated with said lower portion.

45. The lifting device of claim 39 wherein said upper portion is secured to said second end of said lift arm and said lower portion is pivotably attached to said lift arm.

46. A lifting device for lifting and tilting a refuse container, said lifting device comprising:
   (a) a base;
   (b) a drive unit mounted to said base and having a rotatable output shaft, said output shaft having two opposed ends defining a first axis about which said output shaft is rotatable;
   (c) a carriage for engaging and lifting the refuse container, said carriage including an upper portion carrying an upper hook and a lower portion carrying a lower hook, said carriage includes a telescoping member extending between said upper portion and said lower portion, said telescoping member including an inner member and an outer member to move said upper and lower hooks relative to one another as said carriage is raised or lowered;
   (d) at least one lift arm having a first end carried by said output shaft, a second end associated with said carriage, and a hinge at an intermediate location between said first and second ends, said hinge dividing said lift arm into first and second arm portions which are pivotably joined at said hinge, said first arm portion of said lift arm carrying said upper portion of said carriage and said second arm portion of said lift arm pivotably carrying said lower portion of said carriage, said hinge permitting pivotable movement of said lower portion to allow pivotable movement of said lower hook relative to said upper hook independent of rotation of said output shaft; and
   (e) at least one actuator arm having a first end pivotably carried by said base and a second end being associated with said outer member of said telescoping member.

* * * * *